J. A. HUGGETT.

Machine for Making Horseshoe-Nails.

No. 8,003. Reissued Dec. 18, 1877.

*Witnesses:*

J. C. Brecht

W. G. England

*Inventor:*

*John Albert Huggett,*

*by*

*George H. Christy*

*Atty.*

N. PETERS, PHOTO-LITHOGRAPHER, WASHINGTON, D. C.

J. A. HUGGETT.

Machine for Making Horseshoe-Nails.

No. 8,003. Reissued Dec. 18, 1877.

*Witnesses:*

T. C. Brecht.

A. J. Engrand.

*Inventor:*

John Albert Huggett by

George H. Christy

Att'y.

N. PETERS, PHOTO-LITHOGRAPHER, WASHINGTON, D. C.

J. A. HUGGETT.
Machine for Making Horseshoe-Nails.
No. 8,003. Reissued Dec. 18, 1877.
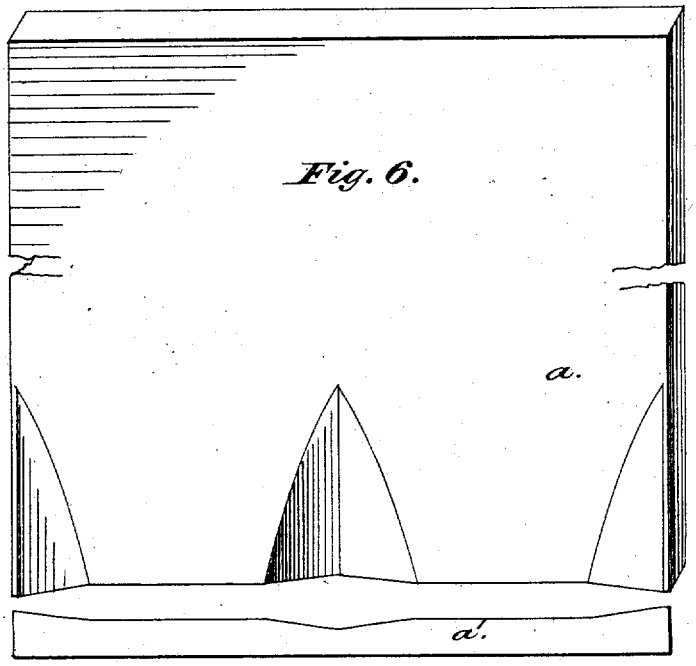
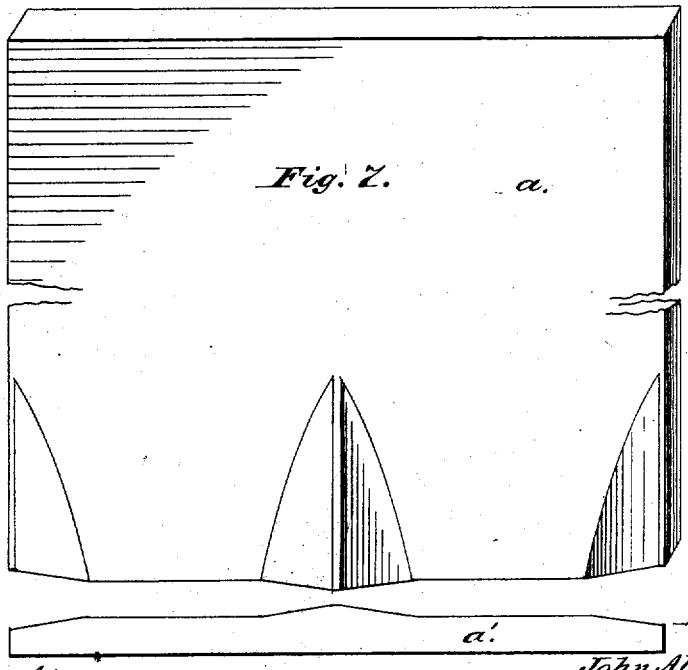
Witnesses:
T. C. Brecht
A. F. England
Inventor:
John Albert Huggett,
by
George H. Christy
Att'y.
N. PETERS, PHOTO-LITHOGRAPHER, WASHINGTON, D. C.

UNITED STATES PATENT OFFICE.

JOHN ALBERT HUGGETT, OF CLAPHAM, ENGLAND.

IMPROVEMENT IN MACHINES FOR MAKING HORSESHOE-NAILS.

Specification forming part of Letters Patent No. 181,784, dated September 5, 1876; Reissue No. 8,003, dated December 18, 1877; application filed September 13, 1877.

*To all whom it may concern:*

Be it known that I, JOHN ALBERT HUGGETT, of 12 Ferndale Road, Clapham, in the county of Surrey, England, have invented new and useful Improvements in the Manufacture of Horseshoe-Nails, which improvement is fully set forth in the following specification.

This invention has for its object improvements in the manufacture of horseshoe-nails.

According to my invention I employ a metal which, in addition to possessing all the other qualities necessary for a horseshoe-nail—such as tenacity, softness, and pliability—is homogeneous, or nearly so, and as strong in one direction as another, so that there is no necessity that the nail should be cut in the direction in which the metal is rolled. The metal I employ is a soft cast-steel produced by the Bessemer process from charcoal-iron. A similar steel is also produced by the Siemens-Martin process, and may be used equally well. I roll a bar or plate from this metal, of a section corresponding in form to a horseshoe-nail, or, preferably, to two horseshoe-nails placed point to point, so that there are flanges or ribs on the edges of the bar corresponding to the heads of the nails. From this bar I shear the nails. The bar is cut up by two pairs of shears, to which it is taken alternately, and this I do by automatic mechanism, as hereinafter described. The first pair of shears shapes the end of the bar by cutting off a waste piece along nearly or quite the entire width of the bar, and the second pair of shears then cuts off two completely-formed horseshoe-nails, and so on alternately; first a waste piece is removed, and then two nails are cut from the end of the bar. The nails are rubbed to remove any roughness from the edges, and they are then annealed.

In order that my invention may be fully understood and readily carried into effect, I will proceed to describe the drawings hereunto annexed.

Figure 1:
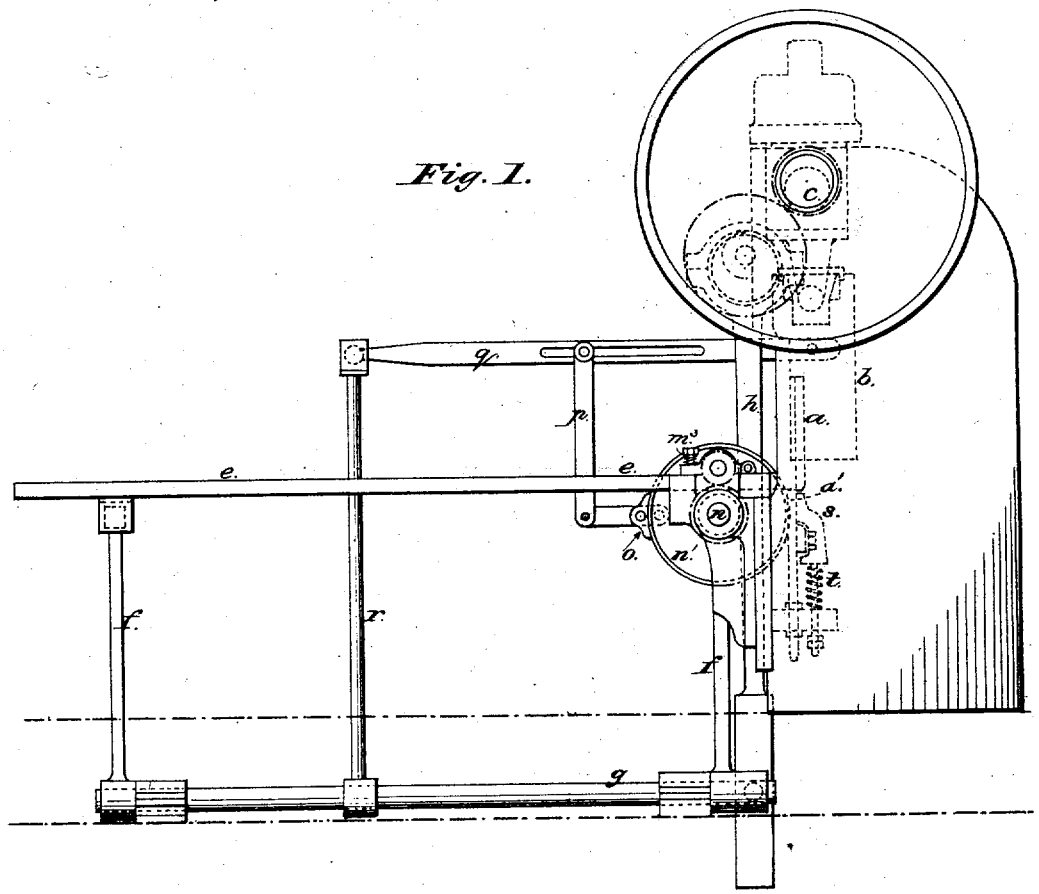
Figure 3:
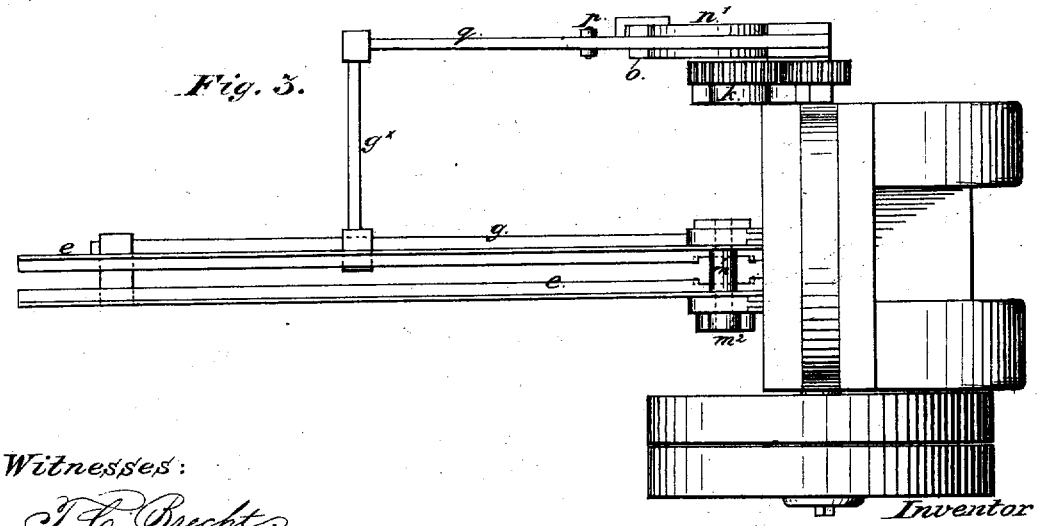
Figure 2:
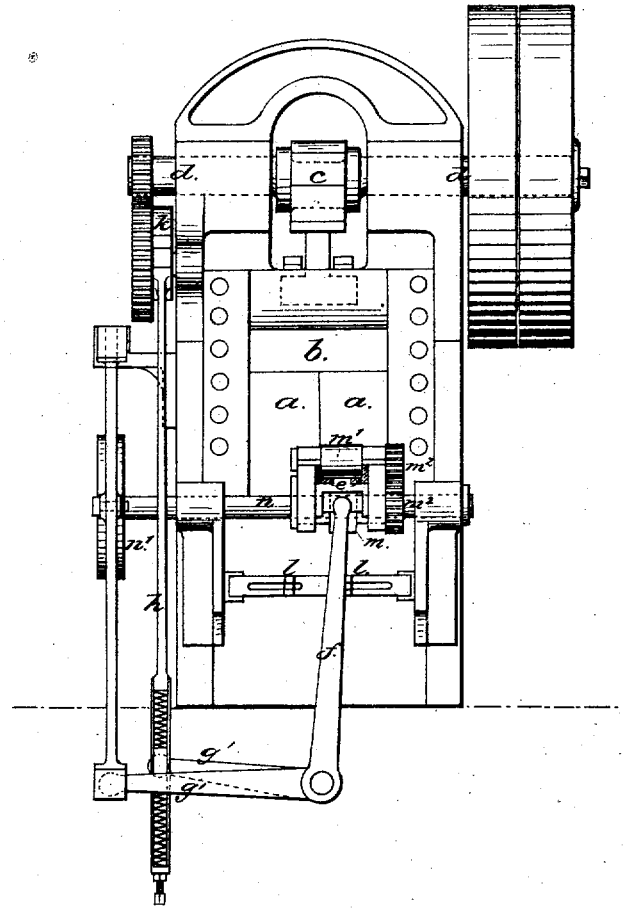

Figures 1, 2, and 3 of the drawings show various views of an automatic machine for transversely cutting up the bar into nails, in the manner above described. Fig. 1 is a side elevation, Fig. 2 a front elevation, and Fig. 3 a plan, of the machine.

The bar is, as before stated, first rolled to a section corresponding in form to two horseshoe-nails placed point to point. The form of the head may vary considerably. A very usual form is that shown at Figs. 4 and 5.

Figure 5:
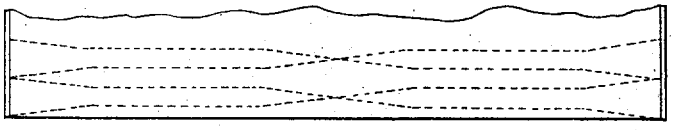
Figure 4:
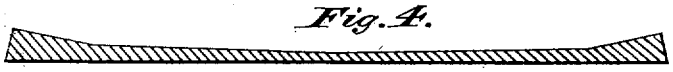

Fig. 4 shows a transverse section of the bar from which the nails are to be cut, and Fig. 5 a plan view of the same. The manner in which it is sheared into nails by successive cuts is shown by dotted lines.

In Figs. 6 and 7 I have shown the cutting ends of the cutters or blades by an enlarged view and more in detail, corresponding in proportions to Figs. 4 and 5.

In place of the bar being rolled to the section of two nails placed point to point, it might be rolled to the section of one nail only, and be cut up into nails by successive cuts in the same manner. I, however, prefer to form it in the section of two nails, as above described.

The machinery for effecting the shearing up of the bar into nails is composed of two pairs of shears, as before stated. The movable blade *a* of each pair is carried by a slide, *b*, to which an up-and-down motion is imparted by an eccentric, *c*, on the main shaft *d*. The fixed blades *a'* of the shears are secured to the framing of the machine. The plate to be sheared is laid into a trough or holder, *e*, which is carried at its two ends by rods or arms *f* on a shaft, *g*, to which a rocking motion is imparted.

By this means a sidewise to-and-fro motion is given to the trough or holder, and the end of the bar carried by it is presented alternately to the action of the two pairs of shears. The rocking motion is given to the shaft *g* by a rod, *h*, passing from an arm, *g'*, on the shaft *g* to an eccentric, *k*, which is driven from the main shaft, and at half its speed.

The amount of movement given to the rod *h* by the eccentric is more than sufficient to give the requisite traverse to the trough or holder, and the rod *h* is not jointed directly to the arm *g'* on the shaft *g*; but this arm is jointed to a slide capable of traversing along the rod, and a spring is placed both above and below the slide.

By this means, when the trough or holder has been moved sidewise to either extremity of its traverse, and is arrested by stops *l*, the spring, either above or below the slide, will be compressed, and the trough or holder will remain at rest, and while it remains at rest the end of the bar carried by it will be acted upon by one or other of the pairs of shears.

In order to feed forward the bar a proper distance after its end has been acted upon by both pairs of shears, the end of the bar is held between rollers $m$ $m^1$. The rollers are both carried with the trough, and the bearings of the upper roller $m^1$ are mounted upon it; but the lower roller $m$ is able to slide with groove and feather along the axis $n$, having its bearings on the main frame. The rollers $m$ $m^1$ are geared together by the pinions $m^2$, and they are made to nip the bar firmly by coiled springs $m^3$. The bottom of the trough $e$ is cut away to allow the rollers to nip the bar. The axis $n$ is rotated step by step by having a broad-tread or flanged disk, $n'$, fixed upon it, with which a nipping-pawl, $o$, engages.

The pawl-lever is actuated by a connecting-rod, $p$, passing to the lever $q$, which, at one end, has its fulcrum on the frame, and at the other is connected, by the rod $r$, with the arm $g^{\times}$ upon the rocking shaft $g$.

The lever $q$ is slotted, as is shown, and the end of the rod $p$ is adjustable along it, for the purpose of adjusting the feed as may be required.

From the foregoing description it will be seen that the trough or holder is given a bodily sidewise or parallel motion only, and that the nail-bar is fed forward to the shears independently of the trough or holder by the feeding-rollers.

At the back of the fixed blades of the shears a presser-plate, $s$, is mounted, held up by powerful springs $t$. When the slide $b$ descends, the piece to be detached from the bar becomes held between the upper cutter and the presser-plate before the piece is shorn off, which insures the cut being truly made.

When the slide carrying the movable jaws of the shears rises, the piece cut off from the plate remains held until the presser-plate $s$ comes level with the fixed shear-blades. The movement of the presser-plate is then arrested, and the piece cut off falls away or is knocked off as soon as the plate from which it had been cut off is moved sidewise. The waste pieces cut off by one pair of shears fall into one receptacle to be remelted and rerolled, while the nails cut away by the other pair of shears fall into a separate receptacle.

It will be observed that the waste piece cut off extends not only along the nail-points, but also along up the shank or body of the nail, so as to give as a result of the cutting operation a head which is broader than the shank. This feature I believe to be new, and it is secured as a result of the form of the cutting-blades or shears, as represented in Figs. 6 and 7, and by the lines of cut in Figs. 4 and 5; and this feature of construction and operation renders unnecessary the additional forging operation heretofore required in sheared nails to reduce the width of the shank.

I am aware that nails have heretofore been cut from plates rolled to a form corresponding in cross-section to the shape of the nails, and do not, therefore, broadly claim cutting nails from plates of such shape.

Having thus described the nature of my invention, and the manner of performing the same, I would have it understood that I claim—

1. The combination, substantially as hereinbefore set forth, of the shears, the nail-plate holder, having a sidewise to-and-fro motion only imparted to it, each successive motion being in a direction the reverse of the preceding, the axis having its bearings on the main frame, and rotated step by step, the feeding-rollers carried with the holder, and the groove-and-feather connection between one of said rollers and the intermittently-rotated axis, whereby the roller, while free to move with the holder along said axis, is positively rotated therewith to feed the plate to the shears.

2. The combination of the rocking shaft $g$, the nail-plate holder supported and moved sidewise thereby, fixed stops for limiting the traverse of the holder, the pitman $h$, the arm connecting the pitman and the rocking shaft, and the spring-bearing connection between the pitman and connecting-rod, these members being constructed and operating substantially as set forth, for the purpose specified.

3. The combination, substantially as hereinbefore set forth, of the swinging lever $q$, the disk, its pawl and lever operated by the swinging lever, the disk-axis, the pinions operated thereby, the nail-plate holder, and the feeding-rollers.

4. The combination of the eccentric driven by gearing from the main shaft, the pitman-rod operated by the eccentric, the rocking shaft connected with the pitman and supporting the nail-plate holder, the swinging lever connected with the rocking shaft, and the intermittently-moving disk, operated through its connection with the swinging lever, and imparting motion to the rollers for feeding the nail-plate, these members being constructed and operating substantially as hereinbefore set forth.

5. The combination of shears $a$ $a'$, laterallyreciprocating nail-plate holder, intermittently-acting feed-rolls, presser-plate, and spring, substantially as set forth.

6. Nail-cutting shears constructed substantially as described, with reference to cutting alternately with the nail or nails a waste piece along nearly or quite the entire width of the bar or plate, and thereby forming one edge of the point, and also one edge of a shank, narrower than the head.

In testimony whereof I have hereunto set my hand.

J. A. HUGGETT.

Witnesses:
G. F. WARREN,
JNO. DEAN,
*Both of No. 17 Gracechurch Street, London.*